United States Patent
Tanaka

(10) Patent No.: US 8,189,250 B2
(45) Date of Patent: May 29, 2012

(54) RECORDING/PLAYBACK APPARATUS, RECORDING APPARATUS, PLAYBACK APPARATUS, RECORDING/PLAYBACK METHOD, RECORDING METHOD, AND PLAYBACK METHOD

(75) Inventor: Kenji Tanaka, Tokyo (JP)

(73) Assignee: Sony Corporation, Tokyo (JP)

( * ) Notice: Subject to any disclaimer, the term of this patent is extended or adjusted under 35 U.S.C. 154(b) by 452 days.

(21) Appl. No.: 12/549,614

(22) Filed: Aug. 28, 2009

(65) Prior Publication Data

US 2010/0060961 A1   Mar. 11, 2010

(30) Foreign Application Priority Data

Sep. 8, 2008   (JP) ................................. 2008-229639

(51) Int. Cl.
G03H 1/12 (2006.01)
G03H 1/26 (2006.01)
G11B 7/00 (2006.01)

(52) U.S. Cl. .............................. 359/11; 359/22; 269/103

(58) Field of Classification Search .................... 359/11, 359/22; 369/103

See application file for complete search history.

(56) References Cited

U.S. PATENT DOCUMENTS

| 6,281,993 | B1 | 8/2001 | Bernal et al. |
| 2006/0221421 | A1 | 10/2006 | Kanesaka |
| 2008/0080030 | A1 | 4/2008 | Fukumoto et al. |
| 2008/0144147 | A1 | 6/2008 | Hara et al. |
| 2008/0310281 | A1 * | 12/2008 | Hara et al. ..................... 369/103 |

FOREIGN PATENT DOCUMENTS

| EP | 1 876 591 | 1/2008 |
| JP | 2007-187775 | 1/2006 |
| JP | 2006-107663 | 4/2006 |
| JP | 2008-102200 | 5/2008 |
| JP | 2008-107599 | 5/2008 |
| JP | 2008-130137 | 6/2008 |

* cited by examiner

*Primary Examiner* — Alessandro Amari
(74) *Attorney, Agent, or Firm* — Robert J. Depke; Rockey, Depke & Lyons, LLC

(57) ABSTRACT

A recording/playback apparatus includes a light-generating and intensity-modulating section for generating signal light and reference light to be shined on a hologram recording medium and a phase modulating section for performing phase modulation on the signal light and the reference light on the basis of a pixel unit by using the first to nth phase modulation levels. For the phase modulation on the reference light, all pixels corresponding to the reference light are divided and set using random phase units, each having a predetermined pixel array pattern having at least two pixels, the number of pixels corresponding to each of the first to nth phase modulation levels in each random phase unit is common to the random phase units, and the array pattern of the pixels corresponding to the first to nth phase modulation levels is random for each random phase unit.

11 Claims, 12 Drawing Sheets

WHITE: "0"
BLACK: "π"

WHITE: "0"
BLACK: "π"

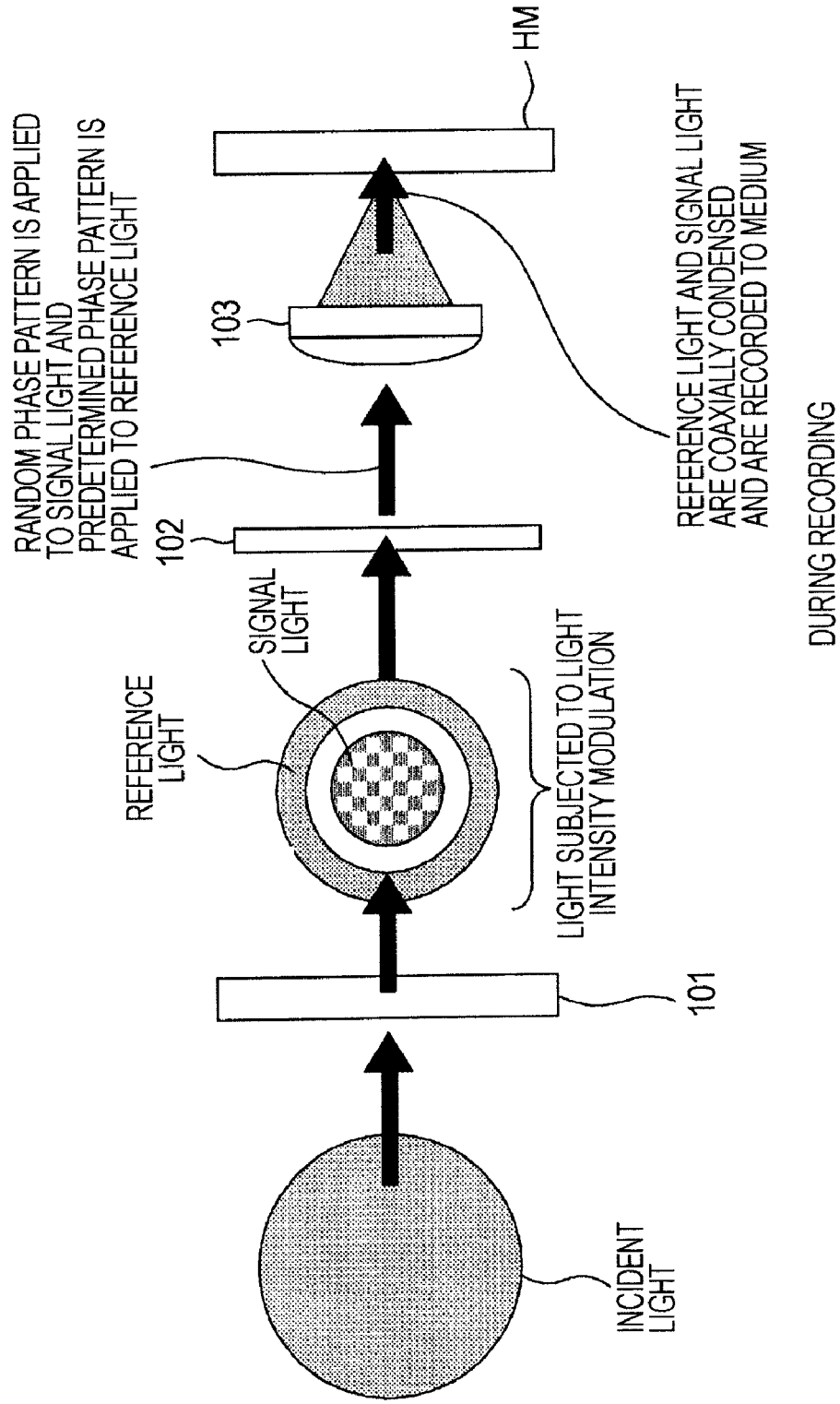

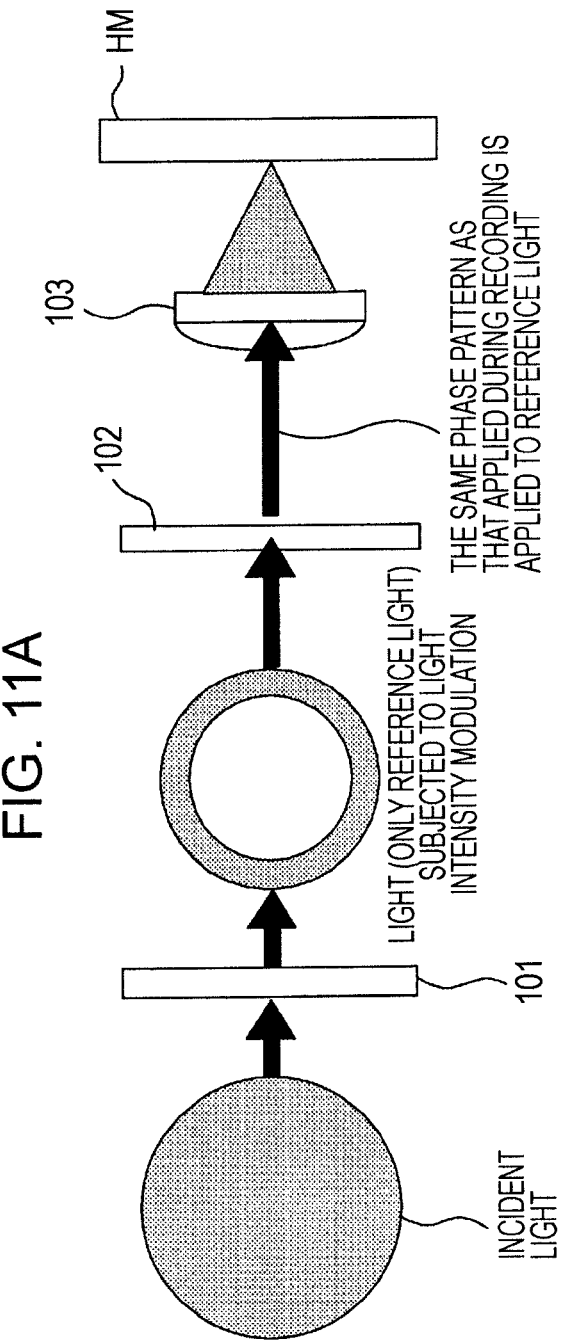
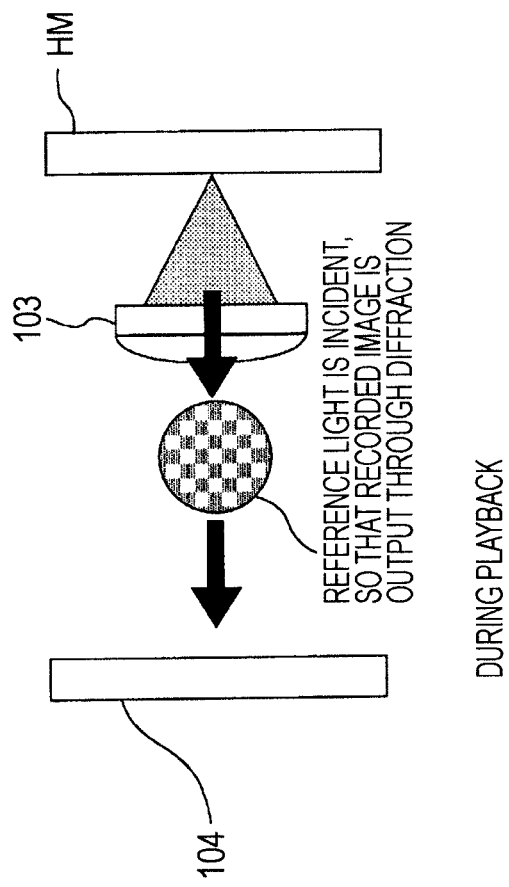
FIG. 11A
FIG. 11B

RECORDING/PLAYBACK APPARATUS, RECORDING APPARATUS, PLAYBACK APPARATUS, RECORDING/PLAYBACK METHOD, RECORDING METHOD, AND PLAYBACK METHOD

The present application claims priority to Japanese Patent Application JP 2008-229639 filed in the Japan Patent Office on Sep. 8, 2008, the entire contents of which are hereby incorporated by reference.

BACKGROUND OF THE INVENTION

1. Field of the Invention

The present invention relates to a recording/playback apparatus and method for performing recording/playback on a hologram recording medium to which data is recorded by interference fringes of signal light and reference light. The present invention also relates to a recording apparatus and method for performing recording on a hologram recording medium and a playback apparatus and method for performing playback on a hologram recording medium.

2. Description of the Related Art

For example, Japanese Unexamined Patent Application Publication No. 2006-107663 discloses a hologram recording/playback system that records data by using interference fringes between signal light and reference light and that plays back the data, recorded by the interference fringes, by shining the reference light. As the hologram recording/playback system, the so-called "coaxial system" in which the signal light and the reference light are coaxially arranged to perform recording is available.

FIGS. 10 and 11 illustrate schemes for hologram recording/playback based on the coaxial system, FIG. 10 illustrating a scheme for recording and FIG. 11 illustrating a scheme for playback.

Referring first to FIG. 10, during recording, a light intensity modulator 101 performs, as spatial light modulation, light intensity modulation on incident light from a light source to generate signal light and reference light that are coaxially arranged as shown. The light intensity modulator 101 is implemented by, for example, a liquid crystal panel.

In this case, the signal light is generated by performing spatial light modulation corresponding to record data. The reference light is generated by performing spatial light modulation using a predetermined pattern.

The signal light and reference light generated by the light intensity modulator 101, as described above, are subjected to spatial phase modulation performed by a phase mask 102. As shown, the phase mask 102 applies a random phase pattern to the signal light and applies a predetermined phase pattern to the reference light.

The phase mask 102 performs phase modulation for each pixel unit. The term "pixels" as used herein refer to individual pixels that constitute a modulation surface for light modulation, the modulation surface being included in the light intensity modulator 101. For example, when the light intensity modulator 101 has a liquid crystal panel, one of the pixels that constitute the liquid crystal panel corresponds to one pixel unit mentioned above.

The reason why random phase patterns are applied to the signal light and the reference light is to improve the efficiency of interference between the signal light and the reference light, to reduce DC (direct current) components through diffusion of the spectra of the signal light, and to increase the recording density.

As a result of the light intensity modulation performed by the light intensity modulator 101, light having light intensities modulated into 0 and 1 in accordance the record data is generated as the signal light. The signal light is subjected to phase modulation with a phase of 0 or $\pi$, so that light having −1, 0, and 1 (+1) representing amplitudes at a wave surface of the light is generated. That is, when a pixel modulated with a light intensity of 1 is subjected to modulation with a phase of 0, the amplitude is 1, and when a pixel modulated with a light intensity of 0 is subjected to modulation with a phase of $\pi$, the amplitude is −1. The phase of a pixel with a light intensity of 0 remains to be 0 with respect to either of a phase of 0 and a phase of $\pi$.

FIGS. 12A and 12B show a difference in the signal light and the reference light between a case (FIG. 12A) in which the phase mask 102 is absent and a case (FIG. 12B) in which the phase mask 102 is present. In FIGS. 12A and 12B, large/small relationships in light amplitudes are expressed by color densities. More specifically, in FIG. 12A, black and white represent amplitudes of 0 and 1, respectively, and in FIG. 12B, black, gray, and white represent amplitudes of −1, 0, and 1 (+1), respectively.

The intensity of the signal light in this case is modulated according to record data. Thus, light intensities (amplitudes) of 0 and 1 are not necessarily randomly arranged, thereby promoting generation of DC components.

The phase pattern applied by the phase mask 102 is a random pattern. Thus, pixels whose light intensities of the signal light output from the light intensity modulator 101 are 1 can be randomly divided so that the number of pixels with an amplitude of 1 and the number of pixels with an amplitude of −1 are equal to each other. As a result of such random division into the pixels with an amplitude of 1 and the pixels with an amplitude of −1, it is possible to uniformly scatter spectra in a Fourier plane (a frequency plane, which may in this case be regarded as an image on the medium), thereby making it possible to suppress DC components in the signal light.

Such suppression of DC components in the signal light makes it possible to improve the data recording density.

DC components in the signal light may cause the intensities of the shined light to be concentrated in a recording material. This causes the recording material to react greatly, thus making it very difficult to perform, for example, multiplexed recording. That is, such a phenomenon makes it very difficult to perform multiplexed recording of data to beyond a portion in which the DC components are recorded. Accordingly, suppressing the DC components using the above-described random phase pattern enables data multiplexed recording, thus making is possible to perform high-density recording.

A description will now be given with reference back to FIG. 10.

Both of the signal light and reference light subjected to the phase modulation by the phase mask 102 are condensed by an objective lens 103 and the resulting light is shined on a hologram recording medium HM. Consequently interference fringes (a grating, i.e., a hologram) corresponding to the signal light (a record image) are formed on the hologram recording medium HM. Through the formation of the interference fringes, data is recorded.

Subsequently, during playback, as shown in FIG. 11A, the light intensity modulator 101 performs spatial light modulation (intensity modulation) on incident light to generate reference light. The generated reference light is subjected to spatial light phase modulation by the phase mask 102 so as to be given the same predetermined phase pattern as the phase pattern applied during the recording.

In FIG. 11A, the reference light subjected to the phase modulation by the phase mask 102 is shined on the hologram recording medium HM through the objective lens 103.

In this case, the reference light has the same phase pattern as that applied during the recording. As a result of shining of the reference light on the hologram recording medium HM, diffracted light corresponding to a recorded hologram image is obtained and is output as reflection light from the hologram recording medium HM, as shown in FIG. 11B. Thus, a playback image (playback light) corresponding to the recorded data is obtained.

The thus-obtained resulting playback light is received by an image sensor 104, such as a CCD (charge coupled device) sensor or a CMOS (complementary metal oxide semiconductor) sensor, and data is played back on the basis of signals of the light received by the image sensor 104.

SUMMARY OF THE INVENTION

In general, the reference light has a distribution of intensities that are strong at the center portion thereof and that become low toward the outer circumference. This means that, with respect to a page on the hologram recording medium, recording to low-frequency areas adjacent to the center portion is performed with high light intensities and recording to high-frequency areas adjacent to the output circumference is performed with low light intensities. This means, in terms of a frequency characteristic of the signal light, a higher frequency band is reduced. Since such a frequency characteristic of the signal light leads to one factor of deterioration of a playback signal characteristic and so on, it is preferable that an improvement be made as much as possible.

In order to overcome the above-described problem, according to an embodiment of the present invention, there is provided a recording/playback apparatus.

The recording/playback apparatus includes: light-generating and intensity-modulating means for generating, in response to incident light from a light source, signal light and reference light to be shined on a hologram recording medium, wherein during recording, the light-generating and intensity-modulating means generates the signal light by performing light intensity modulation for each pixel unit in accordance with record data and generates the reference light by performing light intensity modulation for each pixel unit so that the reference light has a predetermined light-intensity modulation pattern, the reference light being used for recording data to the hologram recording medium through interference fringes formed together with the signal light, and during playback, the light-generating and intensity-modulating means generates the reference light having the predetermined light-intensity modulation pattern, the reference light being used for obtaining playback light from the hologram recording medium; and phase modulating means for performing phase modulation on the signal light and the reference light on the basis of the pixel unit by using first to nth phase modulation levels (where n is a natural number of 2 or greater), wherein the phase modulating means performs the phase modulation on the reference light, with all pixels corresponding to the reference light being divided and set using random phase units, each having a specific pixel array pattern having at least two pixels represented by N horizontal pixels by M vertical pixels (where N and M are natural numbers of 1 or greater), with the number of pixels corresponding to each of the first to nth phase modulation levels in each random phase unit being set to be common to the random phase units, and with the array pattern of the pixels corresponding to the first to nth phase modulation levels being set to be random for each random phase unit.

According to another embodiment of the present invention, there is provided a recording apparatus.

The recording apparatus includes: light-generating and intensity-modulating means for generating, in response to incident light from a light source, signal light and reference light to be shined on a hologram recording medium, wherein the light-generating and intensity-modulating means generates the signal light by performing light intensity modulation for each pixel unit in accordance with record data and generates the reference light by performing light intensity modulation for each pixel unit so that the reference light has a predetermined light-intensity modulation pattern, the reference light being used for recording data to the hologram recording medium through interference fringes formed together with the signal light; and phase modulating means for performing phase modulation on the reference light, with all pixels corresponding to the reference light being divided and set using random phase units, each having a specific pixel array pattern having at least two pixels represented by N horizontal pixels by M vertical pixels (where N and M are natural numbers of 1 or greater), with the number of pixels corresponding to each of first to nth phase modulation levels in each random phase unit being set to be common to the random phase units (where n is a natural number of 2 or greater), and with the array pattern of the pixels corresponding to the first to nth phase modulation levels being set to be random for each random phase unit.

According to another embodiment of the present invention, there is provided a playback apparatus.

The playback apparatus includes: light-generating and intensity-modulating means for generating, in response to incident light from a light source, reference light to be shined on a hologram recording medium in order to obtain playback light from the hologram recording medium, wherein the light-generating and intensity-modulating means generates the reference light by performing light intensity modulation for each pixel unit so that the reference light has a predetermined light-intensity modulation pattern; and phase modulating means for performing phase modulation on the reference light, with all pixels corresponding to the reference light being divided and set using random phase units, each having a specific pixel array pattern having at least two pixels represented by N horizontal pixels by M vertical pixels (where N and M are natural numbers of 1 or greater), with the number of pixels corresponding to each of first to nth phase modulation levels in each random phase unit being set to be common to the random phase units (where n is a natural number of 2 or greater), and with the array pattern of the pixels corresponding to the first to nth phase modulation levels being set to be random for each random phase unit.

In each configuration described above, an apparatus that is capable of perform recording/playback on a hologram recording medium performs the following phase modulation on the reference light.

That is, phase modulating is performed on the reference light, with all pixels corresponding to the reference light being divided and set using random phase units, each having a specific pixel array pattern having at least two pixels represented by N horizontal pixels by M vertical pixels (where N and M are natural numbers of 1 or greater), with the number of pixels corresponding to each of first to nth phase modulation levels in each random phase unit being set to be common to the random phase units (where n is a natural number of 2 or greater), and with the array pattern of the pixels corresponding to the first to nth phase modulation levels being set to be random for each random phase unit.

The thus-formed pattern having the phase modulation levels allows the number of contiguous pixels having the same phase modulation level to be reduced compared to a case in which the phase modulation level is randomly set, for example, for each pixel unit. As a result, the intensity distribution of the reference light becomes more homogeneous, thus improving a frequency band characteristic.

Since the frequency band characteristic is improved in such a manner, a recording/playback characteristic also improves. Accordingly, it is possible to provide a more reliable recording/playback apparatus.

BRIEF DESCRIPTION OF THE DRAWINGS

FIG. 10 is a diagram illustrating a recording scheme of related art;

FIGS. 11A and 11B are diagrams illustrating a playback scheme of the related art.

DESCRIPTION OF THE PREFERRED EMBODIMENTS

Figure 1:
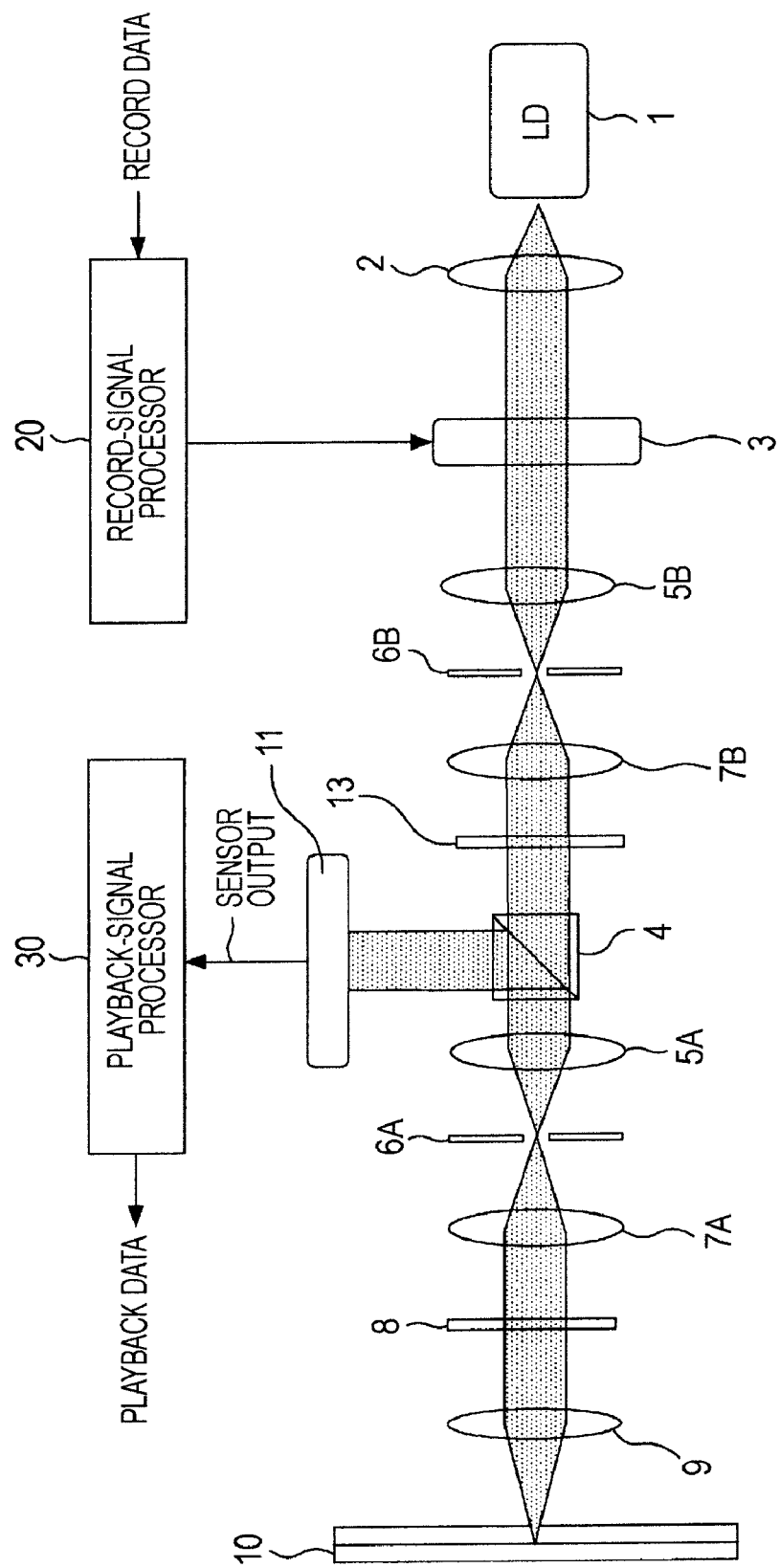
FIG. 1 is a diagram showing the configuration of a hologram recording/playback apparatus, mainly showing the structure of an optical system thereof, according to an embodiment of the present invention.

FIG. 1 shows an example of the configuration of a hologram recording/playback apparatus according to a best mode (hereinafter referred to as an "embodiment") of the present invention. In the example of the configuration shown in FIG. 1, a coaxial system is employed. In FIG. 1, only the configuration of an optical system of a recording/playback apparatus is illustrated and other portions are omitted.

In the coaxial system, signal light and reference light are coaxially arranged. During recording, the signal light and the reference light are shined on a hologram recording medium 10, placed at a predetermined position, to perform data recording using interference fringes, and during playback, the reference light is shined on the hologram recording medium 10 to play back the data recorded with the interference fringes.

In FIG. 1, a laser diode (LD) 1 is disposed as a light source for providing laser light for recording/playback. The laser diode 1 may be implemented by, for example, a laser diode with an external resonator, and the wavelength of laser light thereof is, for example, about 410 nm.

Light emitted from the laser diode 1 passes through a collimator lens 2 and is incident on a light-intensity modulator 3.

The light intensity modulator 3 is implemented by, for example, a transmissive liquid crystal panel. Pixels of the transmissive liquid crystal panel are driven and controlled by a drive signal output from a record-signal processor 20, so that spatial light-intensity modulation (which may simply be referred to as "light intensity modulation" hereinafter) is performed on the incident light for each pixel unit.

Specifically, the light intensity modulator 3 in this case turns on/off the incident light for each pixel unit to perform light intensity modulation. That is, the light intensity modulator 3 performs modulation so as to give a light intensity represented by 1 or 0.

Figure 2:
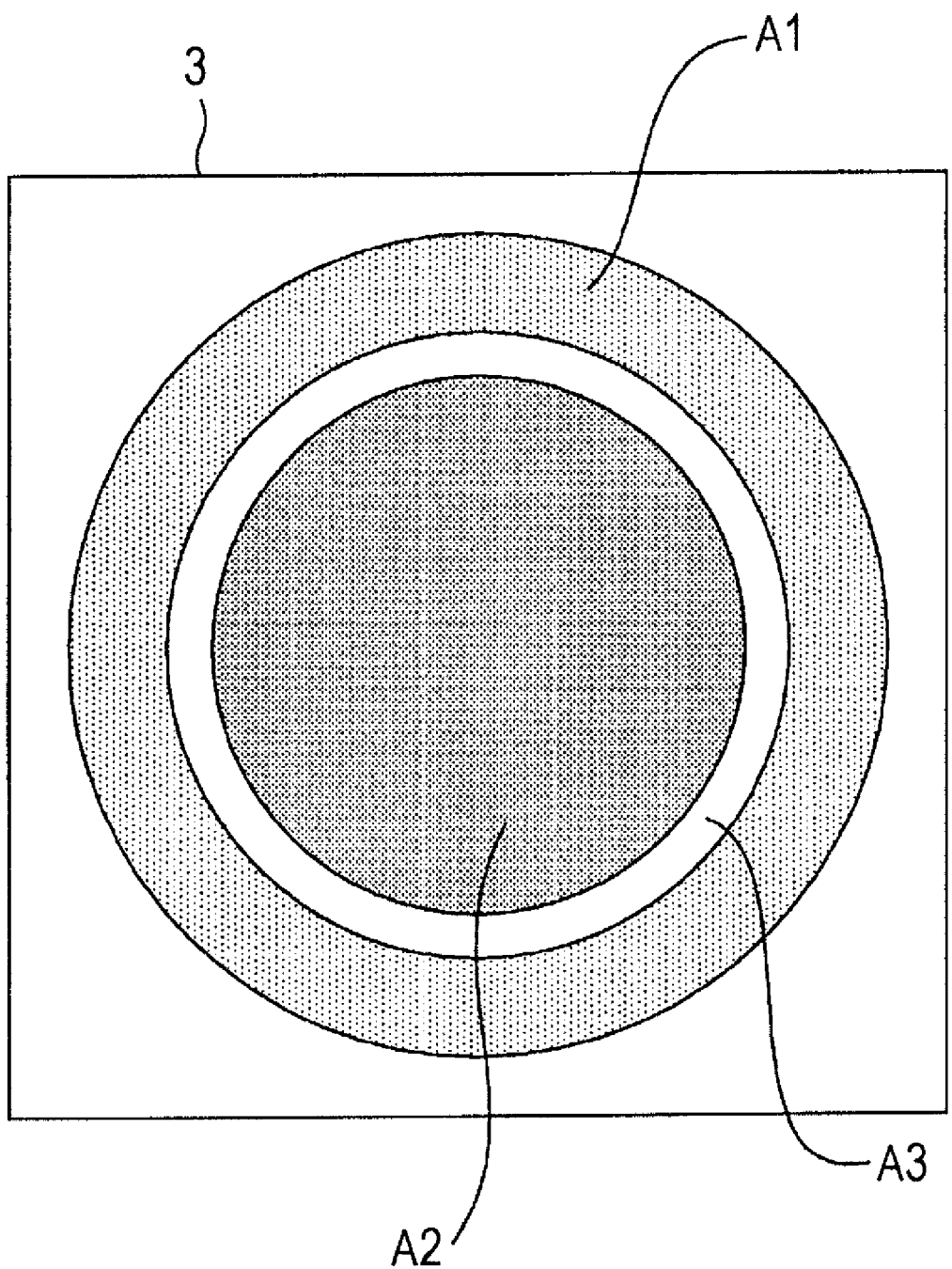
FIG. 2 illustrates a reference-light area, a signal-light area, and a gap area set by a light intensity modulator.

In this case, the light intensity modulator 3 has a reference-light area A1, a signal-light area A2, and a gap area A3, as shown in FIG. 2, so that the reference light and signal light can be independently generated from the incident light.

More specifically, in the light intensity modulator 3 in this case, the signal-light area A2 refers to a predetermined generally circular pixel area including the center area of the light intensity modulator 3, the gap area A3 refers to a predetermined generally ring-shaped pixel area adjacent to the outer circumference of the signal-light area A2, and the reference-light area A1 refers to a predetermined generally ring-shaped pixel area adjacent to the outer circumference of the gap area A3.

Light emitted from the light intensity modulator 3 is incident on a relay lens 5B and is condensed so as to be focused at a predetermined position, as shown. Scattering light after the focusing is incident on a relay lens 7B and is converted thereby into parallel light.

A light-shielding mask 6B is disposed at a position corresponding to the position of a focal point formed as a result of the light condensing at the relay lens 5B, i.e., at a position corresponding to a Fourier plane (a frequency plane).

The light-shielding mask 6B is configured so as to allow passage of only incident light in a predetermined range from the center of an optical axis. During recording, the light-shielding mask 6B reduces the size of the signal light. With this arrangement, recording can be performed at a high density.

The parallel light that has passed through the relay lens 7B is incident on a phase mask 13. The phase mask 13 performs phase modulation on the light (i.e., the signal light and the reference light) input through the light intensity modulator 3.

In this case, typically, the phase mask 13 performs phase modulation on the incident light with one pixel being used as a minimum modulation unit. Specifically, for example, a phase (a phase modulation level) of 0 or $\pi$ is set for each pixel so that the number of pixels having a phase of 0 and the number of pixels having a phase of $\pi$ are equal to each other.

As a result, a random phase pattern is formed with one pixel being used as a minimum modulation unit.

A typical example of the phase mask 13 that enables such phase modulation is a phase mask that is made of optical material, such as glass, having different thicknesses with respect to face portions corresponding to individual pixels. With this structure, in accordance with an optical-path length difference resulting from a difference in the thickness of the optical material, pixels to which a phase of 0 (phase "0") is given and pixels to which a phase of π (phase "π") is given are set.

More specifically, when the phase "π" is to be given, the difference t in the thickness of the material used may be set to satisfy $t=\lambda\{2(n-1)\}$, where λ indicates the wavelength of the incident light and n indicates the refractive index of the material.

As described above, during recording, initially, the phase mask 13 can randomly give the phase "0" or "π" to the signal light.

In this case, a phase of 0 (0°) (i.e., phase "0") corresponds to an amplitude of 1 (i.e., amplitude "1") and a phase of π (180°) (i.e., phase "π") corresponds to an amplitude of −1. In this case, the amplitude "1" for the phase "1" is defined as a reference phase. Hereinafter, the phase "0" and the phase "π" as used herein refer to phase differences from the reference phase. Also, an expression "phase difference from a playback image" as used herein refers to a phase difference from a playback image having the reference phase, i.e., having the amplitude "1" for the phase "0".

Phase modulation using the binary random pattern is performed on the signal light, as described above, thus making it possible to enhance the efficiency of interference between the reference light and the signal light. In addition, it is possible to uniformly scatter spectra in the Fourier plane (an image on the medium), and making the number of pixels with an amplitude of 1 and the number of pixels with an amplitude of −1 to be equal to each other makes it possible to reduce DC (direct current) components in the signal light.

Light emitted from the phase mask 13 passes through a polarization beam splitter 4 and then goes through a relay lens optical system, including a relay lens 5A, a light-shielding mask 6A, and a relay lens 7A. The light then passes through a ¼ wavelength plate 8, is then condensed by an objective lens 9, and is shined on the hologram recording medium 10.

In this case, during recording, the signal light and reference light generated by the light intensity modulator 3 as shown in FIG. 2 are condensed on the hologram recording medium 10 through the above-described path.

During recording, the light intensity modulator 3 performs intensity modulation on the incident light, as described below.

That is, during recording, in response to a drive signal output from the record-signal processor 20, the light intensity modulator 3 is driven so that each pixel in the signal-light area A2 is turned on or off in accordance with record data. Consequently, with respect to the signal-light area A2, the light intensity of each pixel is modulated to have 1 or 0 in accordance with the record data.

With respect to the reference-light area A1, the light intensity modulator 3 is driven so that each pixel is turned on or off (i.e., is modulated to have a light intensity of 1 or 0) in accordance with a predetermined pattern, so that a specific light-intensity modulation pattern (a state of distribution of pixels having a light intensity of 1 or 0) can be formed with respect to the reference light.

In the present embodiment, the light-intensity modulation pattern may also be the so-called "solid pattern" in which all pixels corresponding to the reference light are turned on (i.e., the light intensities are 1).

With respect to the gap area A3 and an area outside the outer circumference of the reference-light area A1, all pixels are turned off (i.e., the light intensities are 0).

As a result of the above-described intensity modulation performed by the light intensity modulator 3, the signal light and the reference light are generated during recording.

The phase mask 13 applies a random phase pattern representing phase differences using 0 and π to the signal light generated by the light intensity modulator 3. The phase mask 13 also applies a predetermined phase pattern to the reference light.

The signal light and the reference light which are subjected to such phase modulation are condensed on the hologram recording medium 10 through the above-described path, so that data is recorded to the hologram recording medium 10 by interference fringes between the signal light and the reference light.

In this case, since a random phase pattern is applied to the signal light, light of pixels subjected to modulation with a light intensity of 1 is modulated so that the light of each pixel has an amplitude (an amplitude value) of 1 (+1) or −1 and so that the number of pixels having an amplitude of 1 and the number of pixels having an amplitude of −1 are substantially equal to each other. This arrangement improves the efficiency of interference between the signal light and the reference light and also reduces DC components of the signal light. A reduction in the DC (direct current) components makes it possible to perform hologram-page multiplexed recording and also makes it possible to increase the recording density.

During playback, the light intensity modulator 3 is driven so that the pixels in the reference-light area A1 have a predetermined ON/OFF pattern and all other pixels are turned off. Thus, only the reference light is generated. With respect to the reference light generated during playback, the phase mask 13 applies the same phase pattern as that applied during recording. The resulting reference light goes through a path to the hologram recording medium 10, the path being similar to the path used during recording, and is shined on the hologram recording medium 10. Since the reference light having the same phase pattern as that applied during recording is shined on the hologram recording medium 10 in that manner, diffracted light corresponding to interference fringes (recorded data) formed on the hologram recording medium 10 is obtained as playback light (a playback image).

The playback light obtained as described above is returned, as reflection light from the hologram recording medium 10, to the recording/playback apparatus. The playback light then passes through the objective lens 9, the ¼ wavelength plate 8, the relay lens 7A, the light-shielding mask 6A, and the relay lens 5A, and the resulting playback light, which is parallel light, is incident on the polarization beam splitter 4.

The playback light that is incident on the polarization beam splitter 4 is reflected thereby and is incident on an image sensor 11.

The image sensor 11 has an image capture element, such as a CCD (charge coupled device) sensor or a CMOS (complementary metal oxide semiconductor) sensor. The image sensor 11 receives the playback light guided as described above from the hologram recording medium 10 and converts the received playback light into electrical signals. With this arrangement, during playback, the image sensor 11 provides light-reception signals (image signals) representing light-intensity detection results about the playback light (the recorded image). That is, the image sensor 11 provides read signals (playback signals) for recorded data.

The playback signals are input to a playback-signal processor 30. The playback-signal processor 30 executes playback-signal processing, such as predetermined decoding processing, to provide playback data corresponding to the original recorded data.

Next, a description will be given of an example of a basic configuration of the playback-signal processor 30.

The following premises will first be described before the description of the playback-signal processor 30 is given.

In a hologram recording/playback system, because of limitations of optical distortion, a magnification, and so on, it is generally very difficult to precisely align the pixels of the light intensity modulator 3 (the pixels may hereinafter be referred to as "data pixels") and the pixels of the image sensor 11 (the pixels may be referred to as "detector pixels") on a one-to-one correlation. That is, it is very difficult to cause a playback image corresponding to individual pixels of the light intensity modulator 3 to be incident precisely on intended pixels on the image sensor 11.

Thus, in order to deal with such displacement, search is performed to locate at which positions in image signals obtained by the image sensor 11 the data pixels of the light-intensity modulator 3 lie. Amplitude values of the data-pixel positions located by the search are obtained, and on the basis of the amplitude values, bit values for the respective data pixels are identified.

Although not illustrated, the image sensor 11 is pre-adjusted so that the amount of light corresponding to the amount of image for one pixel of the light intensity modulator 3 is received by n pixels (n>1) of the image sensor 11 (this scheme is commonly called "oversampling") in order to be able to deal with the above-described playback-image displacement due to optical distortion, a magnification, and so on. For example, the amount of light corresponding to the amount of playback image for one pixel of the light intensity modulator 3 is received by 4 pixels (2×2 pixels) of the image sensor 11. Such oversampling is performed to increase the resolution of a detected image so as to be able to also deal with a case in which playback-image displacement as described above occurs in a sub-pixel unit.

For example, when the oversampling rate is set to 4 (=2×2) as in the above example, the image sensor 11 provides an image signal having a resolution that is four times the resolution of the light intensity modulator 3 and the image signal is input to the playback-signal processor 30 as a playback signal.

Figure 3:
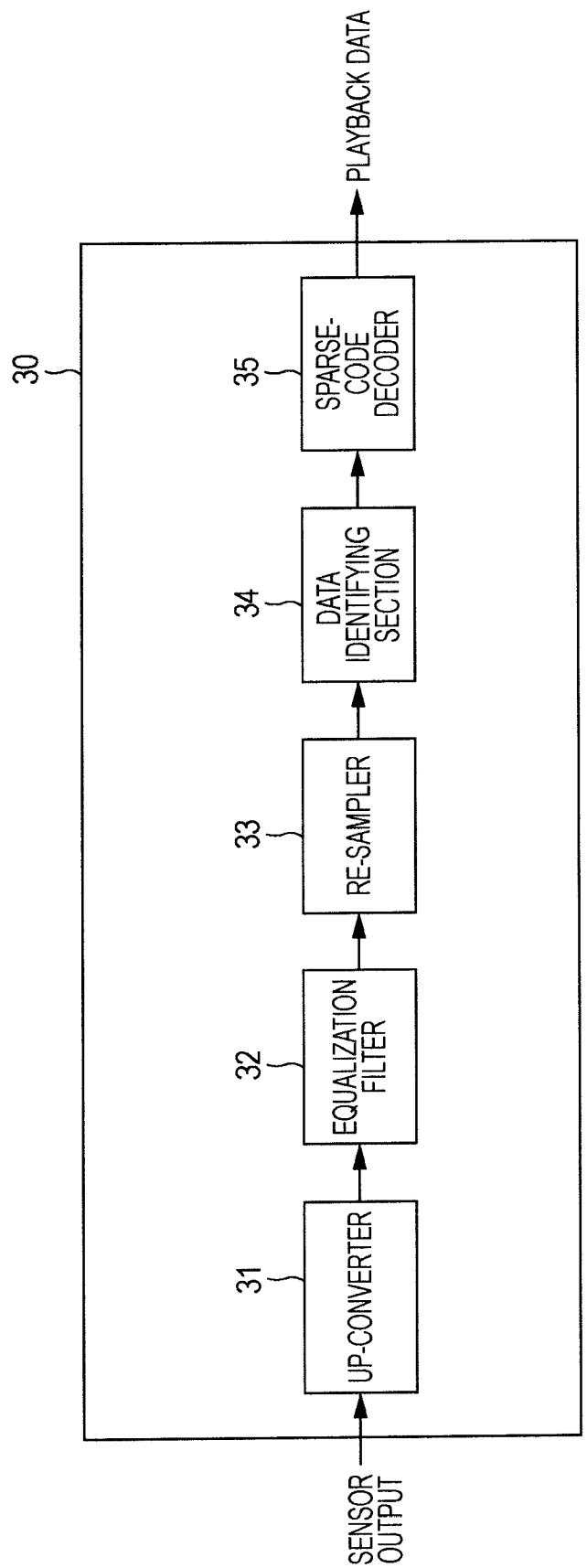
FIG. 3 is a block diagram showing an example of the configuration of a playback-signal processor.

FIG. 3 shows an example of a basic configuration of the playback-signal processor 30.

As shown in FIG. 3, the playback-signal processor 30 includes an up-converter 31, an equalization filter 32, a re-sampler 33, a data identifying section 34, and a sparse-code decoder 35.

In this case, the playback signal output from the image sensor 11 is first input to the up-converter 31. The up-converter 31 performs, for example, interpolation processing on the read signal to up-convert the read signal so that it has a predetermined magnification.

Further performing up-conversion processing on the over-sampled image, in such a manner, makes it possible to further increase the resolution and also makes it possible to more accurately perform position alignment in accordance with a light-shining position displacement in a playback image.

The equalization filter 32 receives the up-converted playback signal output from the up-converter 31 and performs waveform-equalization processing for inter-code interference prevention.

This equalization processing for the inter-code interference prevention is two-dimensionally extended processing of one-dimensional-signal waveform equalization processing that is widely used in the fields of optical discs, communication, and so on.

The re-sampler 33 locates the positions of the respective data pixels of the light intensity modulator 3, the positions being indicated in the playback signals (the image signals) subjected to the equalization processing performed by the equalization filter 32, and obtains the amplitude values of the located data pixels (this processing is called "re-sampling").

A scheme in which predetermined pattern data called "sync" is pre-contained in recorded data is available to locate the positions of data pixels in the image signals. When this scheme is employed, the re-sampler 33 searches the image signals for sync fields (which serve as the predetermined pattern) and locates the positions of the respective data pixels on the basis of the positions of detected syncs.

Since such a pixel-data-position locating scheme is not directly relevant to the reading operation in the present embodiment, a detailed description of the scheme is not given herein. The scheme is not particularly limited in the present embodiment and, for example, any optimum scheme, such as a scheme that is currently available or any scheme that may be proposed in the future, may also be employed.

After the positions of the respective data pixels are located as described above, processing for obtaining the amplitude values of the data pixels is performed. An available scheme for the processing is, for example, a scheme for obtaining the amplitude of each located data pixel through calculation based on interpolation processing using values of surroundings of the position of the data pixel. This is a typical scheme in the field of image processing, and examples include a bi-linear interpolation method, a cubic convolution method, and a bicubic spline method.

A nearest neighbor method is also available which does not involve calculation and which selects, as the amplitude value of a located data pixel position, a signal value that is closest in time to the position.

A scheme for such amplitude-value obtaining processing may also be any scheme and is not particularly limited herein.

The data identifying section 34 performs data identification (bit determination) based on the individual data-pixel amplitude values obtained by the re-sampler 33.

In this case, during recording, record data of 8 bits are subjected to sparse coding and are converted into block-shaped data arrays (symbols) each having 16 bits (=4×4 bits) and the symbols are mapped within a hologram page.

In the sparse coding, for example, encoding is performed so that only m bits of 16 bits have 1 and all other bits have 0. Correspondingly, the data identifying section 34 performs data identification (which is also called "sort detection") for each symbol so that the bits of the top m data pixels in descending order of the amplitude values of the data pixels have 1 and the bits of all other data pixels have 0.

Bit values obtained for each symbol as a result of such symbol-wise data identification (sort detection) are supplied to the subsequent sparse-code decoder 35.

The sparse-code decoder 35 receives the symbol-wise bit values obtained as described above and decodes sparse codes for the symbols. That is, the sparse-code decoder 35 decodes 16-bit (4×4 bit) data into its original 8-bit data to thereby reproduce the original recorded data. That is, the sparse-code decoder 35 obtains playback data. The thus-obtained playback data is output from the playback-signal processor 30.

Figure 4:
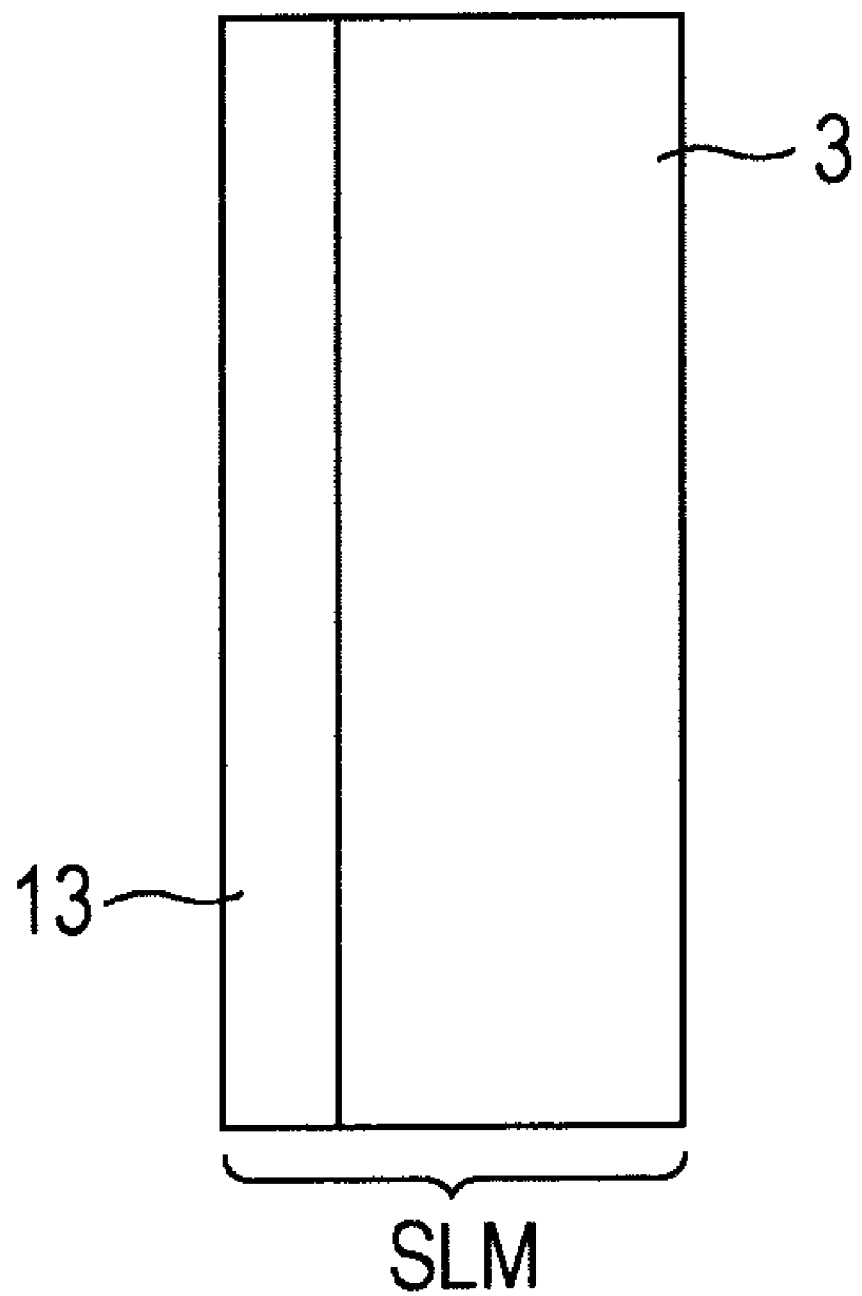
FIG. 4 is a diagram showing an example of the structure of an SLM (spatial light modulator) in which a light intensity modulator and a phase mask are integrated.

In the configuration of the optical system shown in FIG. 1, the phase mask 13 and the light intensity modulator 3 can be integrally formed and provided, with the phase mask 13 being shifted to the light emitting side of the light intensity modulator 3, as shown in FIG. 4. That is, since a portion that receives light emitted from the light intensity modulator 3 corresponds to an actual image plane, the phase mask 13 may be integrally formed with the light emitting surface of the light intensity modulator 3.

In this case, the integration of the light intensity modulator 3 and the phase mask 13 can also be called an SLM (spatial light modulator).

As described above, for the phase-pattern formation performed by the phase mask 13, phase modulation is generally performed at random for each pixel unit, i.e., using one pixel as a minimum modulation unit.

One reason for performing such phase modulation is that as the phase pattern obtained by the phase modulation becomes finer, spectra of the signal light and the reference light are scattered and thus the effect of reducing the peak of DC components can be enhanced.

When spatial light modulation is to be performed for each pixel unit, as in the present embodiment, it can be said that performing phase modulation for each pixel unit provides a finest phase pattern and also maximizes the effect of reducing the peak of DC components.

Figure 5A:
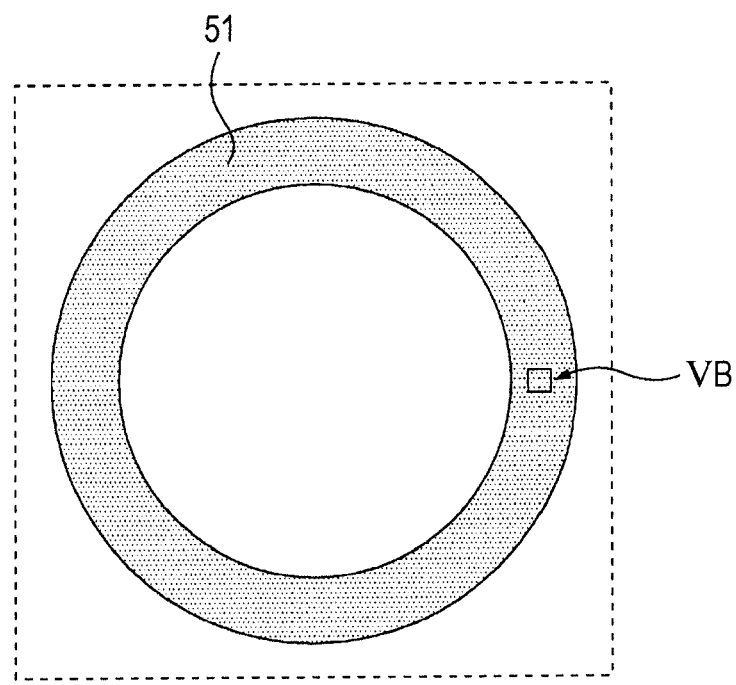
FIGS. 5A and 5B show an example of a phase pattern of reference light formed as a result of phase modulation using a binary random pattern for each pixel unit.
Figure 5B:
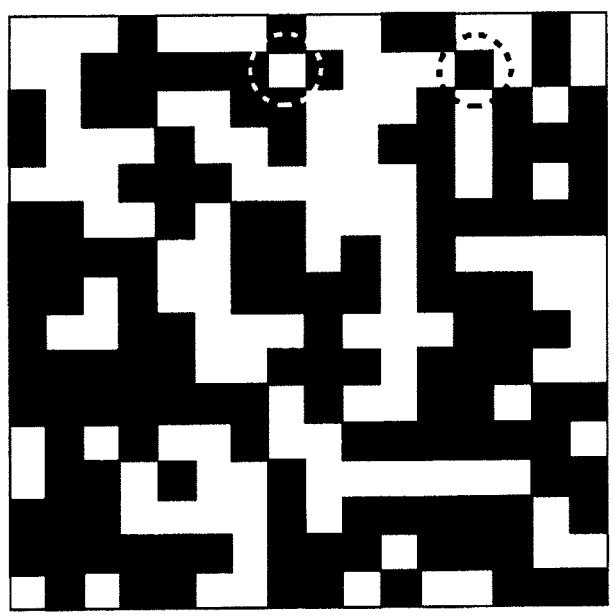

FIGS. 5A and 5B show an example of a phase pattern when phase modulation is performed for each pixel unit with respect to the reference light.

FIG. 5A shows an extraction of the entire image of reference light 51 subjected to the phase modulation as a result of passing through the phase mask 13, and FIG. 5B shows an enlargement of one portion VB of the reference light 51 shown in FIG. 5A.

In FIG. 5B, for example, white portions represent areas corresponding to pixels on which modulation with a phase (a phase modulation level) of 0 was performed and black portions represent areas corresponding to pixels on which modulation with a phase (a phase modulation level) of π was performed.

In FIG. 5B, portions having discrete single pixels, such as portions surrounded by broken lines, are present with respect to the black portions and the white portions. For example, the presence of such a pixel pattern indicates that the phase modulation was performed with one pixel being used as the minimum modulation unit. That is, the phase pattern shown in FIGS. 5A and 5B is a binary random pattern for each pixel unit.

Figure 6A:
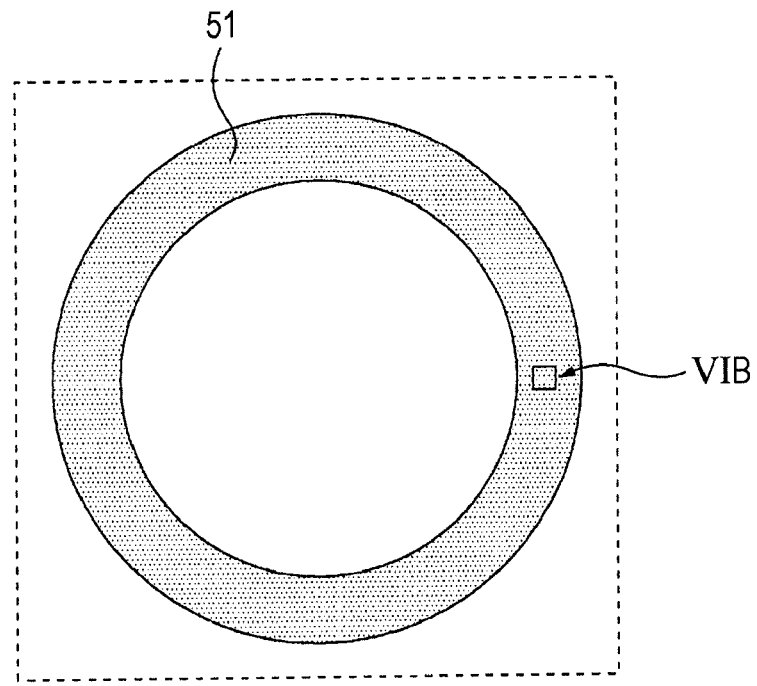
FIGS. 6A and 6B show an example of a phase pattern of reference light formed as a result of phase modulation using a binary random pattern for each random phase unit.
Figure 6B:
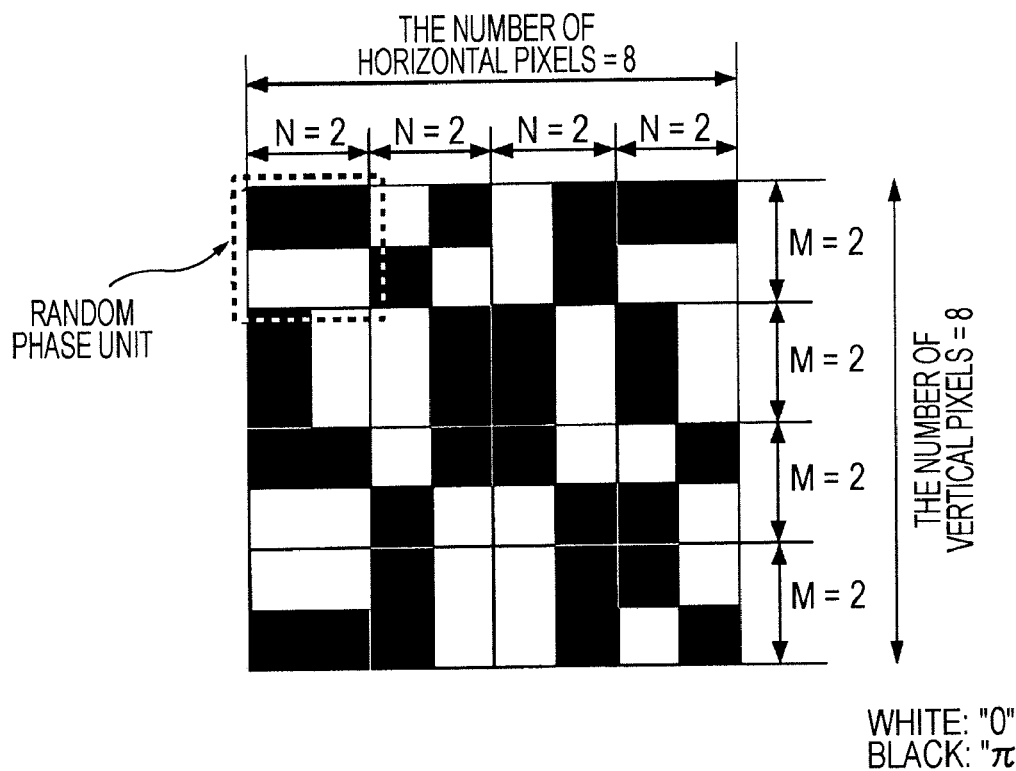

In contrast, in the present embodiment, phase modulation on the reference light is performed as shown in FIGS. 6A and 6B.

As in FIGS. 5A and 5B, one portion VIB of reference light 51 in FIG. 6A is also shown enlarged in FIG. 6B. As in the case described above, in FIG. 6B, white portions represent areas corresponding to pixels on which modulation with a phase of 0 was performed and black portions represent areas corresponding to pixels on which modulation with a phase of π was performed.

In FIG. 6B, the enlargement of the portion VIB of the reference light 51 shown in FIG. 6A is illustrated as an area having 8 horizontal pixels×8 vertical pixels. In this case, the area having the 8×8 pixels is divided into areas, each having an array of N horizontal pixels×M vertical pixels.

In the present embodiment, each of the areas having the N×M pixel arrays obtained by dividing the entire area of the reference light 51 is referred to as a "random phase unit". That is, in the present embodiment, during the phase modulation of the reference light 51, the area of the reference light 51 is divided and set using the random phase units.

The values of the number N of horizontal pixels and the number M of vertical pixels are set based on conditions that N and M are natural numbers of 1 or greater and N×M≧2 is satisfied. That is, each random phase unit is formed by a predetermined pixel array pattern having two or more pixels. As the pixel array pattern for the random phase unit, a pixel array pattern for N=1 and M=2 or a pixel array pattern for N=2 and M=1 has a smallest number of pixels used.

FIG. 6B shows an example in which the random phase unit having an array pattern having 2×2 pixels, where the number N of horizontal pixels is 2 and the number M of vertical pixels is 2.

For the random phase unit set as described above, the number x of pixels with a phase (a phase modulation level) of 0 and the number y of pixels with a phase (a phase modulation level) of π are preset (N×M=x+y, where x and y are natural numbers of 1 or greater). The number x of pixels and the number y of pixels are common to all random phase units provided for the reference light 51. In the example shown in FIG. 6B, the random phase units are set so that the number x of pixels with a phase of 0 and the number y of pixels with a phase of π satisfy x=2 and y=2.

In addition, as shown in FIG. 6B, the array pattern of the pixels with a phase of 0 and the pixels with a phase of π is adapted to be random for each random phase unit.

That is, the example shown in FIGS. 5A and 5B represents a binary-random phase pattern for each pixel unit, whereas the example shown in FIGS. 6A and 6B represents a binary-random phase pattern for each random phase unit having a predetermined number of pixels, i.e., two or more pixels.

For example, as can be understood from comparison between FIG. 5B and FIG. 6B, the use of a binary random pattern for each random phase unit as the phase pattern, as shown in FIGS. 6A and 6B, can reduce the number of contiguous pixels having the same phase (the same phase modulation level), compared to a case in which phase modulation is performed using a binary random pattern for each pixel unit.

Figure 7A:
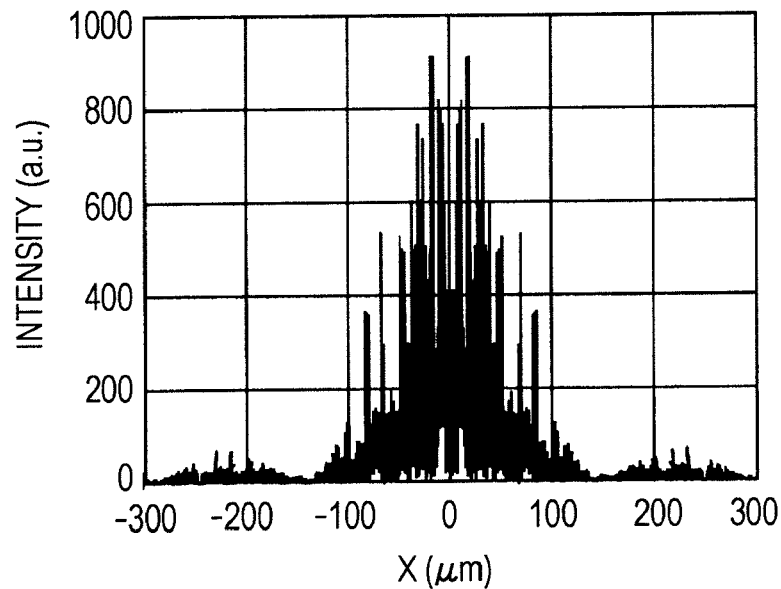
FIGS. 7A and 7B are graphs showing intensity distributions of the reference light on a recording-medium surface, for comparison between the case of phase modulation using a binary random pattern for each pixel unit and the case of phase modulation using a binary random pattern for each random phase unit.
Figure 7B:
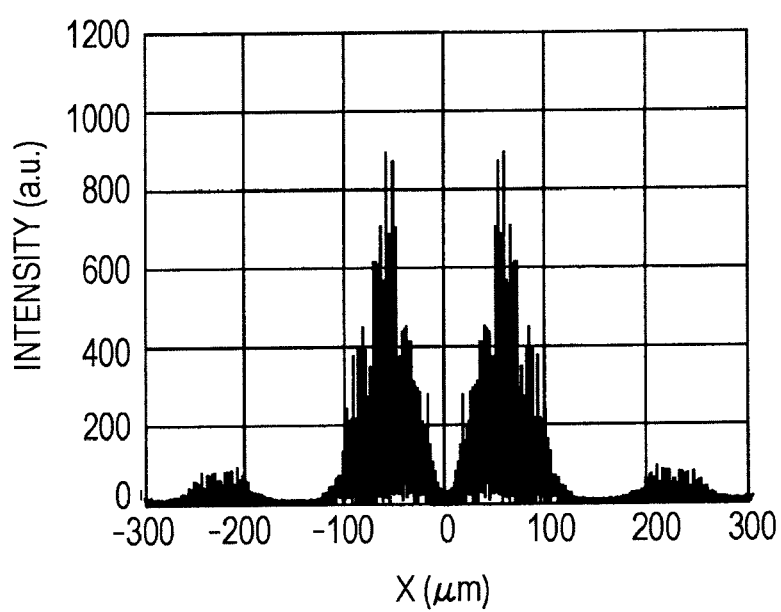

Since the number of contiguous pixels having the same phase is limited as described above, for example, the intensity distribution of the reference light on the recording medium surface (the focal plane) changes as shown in FIGS. 7A and 7B. In FIGS. 7A and 7B, the horizontal axis indicates a distance from the center position of the reference light on the recording medium surface, with the center position being indicated by 0. The vertical axis indicates the intensity.

FIG. 7A shows an intensity distribution of the reference light on the hologram recording medium (the focal plane) in a case (which corresponds to FIGS. 5A and 5B) in which a binary-random phase pattern for each pixel unit is applied. In contrast, FIG. 7B shows an intensity distribution in a case (which corresponds to FIGS. 6A and 6B) in which a binary-random phase pattern for each random phase unit for N=M=2 is applied.

As can be seen from FIGS. 7A and 7B, the peak value(s) in the vicinity of the center is significantly reduced in the case of the binary random pattern for each random phase unit (N=M=2) compared to the peak value(s) in the case of the binary random pattern for each pixel unit. In addition, the intensity distribution in FIG. 7B is more scattered relative to the center than the intensity distribution in FIG. 7A.

That is, in the intensity distribution of the reference light on the recording medium surface, the intensities at the outer circumference in the case of the binary random pattern for each random phase unit (N=M=2) are more emphasized than the intensities in the case of the binary random pattern for each pixel unit.

The frequency of the reference light is low at the center portion and increases as the distance to the outer circumference decreases. Thus, when the above-described result is viewed in terms of a frequency characteristic, the use of the binary random pattern for each random phase unit (N=M=2) can more emphasize high frequency areas. That is, it can be said that this arrangement provides a favorable frequency characteristic, i.e., a frequency increased to a higher frequency band.

Since such a characteristic is given to the reference light, the signal light also gains a favorable frequency characteristic, i.e., a frequency increased to a higher frequency band. Consequently, a recording/playback characteristic also improves.

Figure 8A:
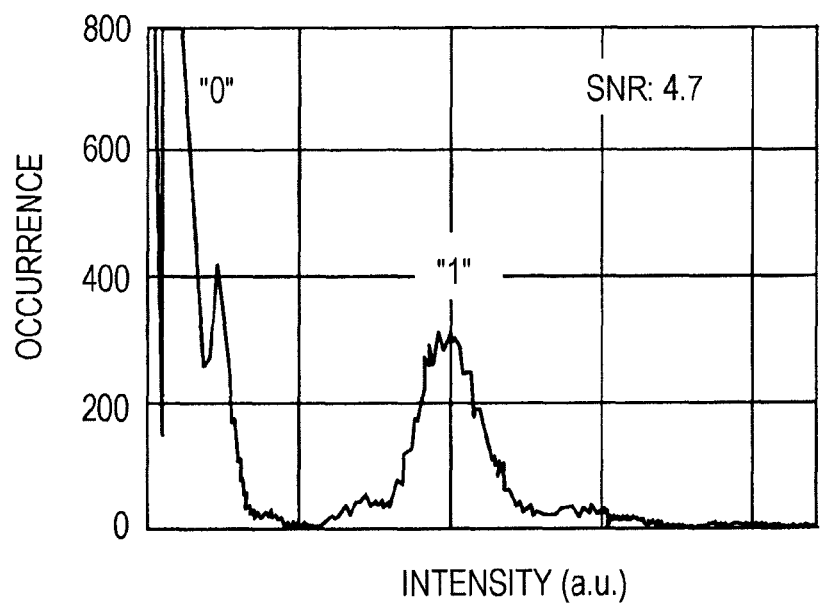
FIGS. 8A and 8B are graphs showing distributions of the number of occurrences of data versus a signal intensity, for comparison between the case of phase modulation using a binary random pattern for each pixel unit and the case of phase modulation using a binary random pattern for each random phase unit.
Figure 8B:
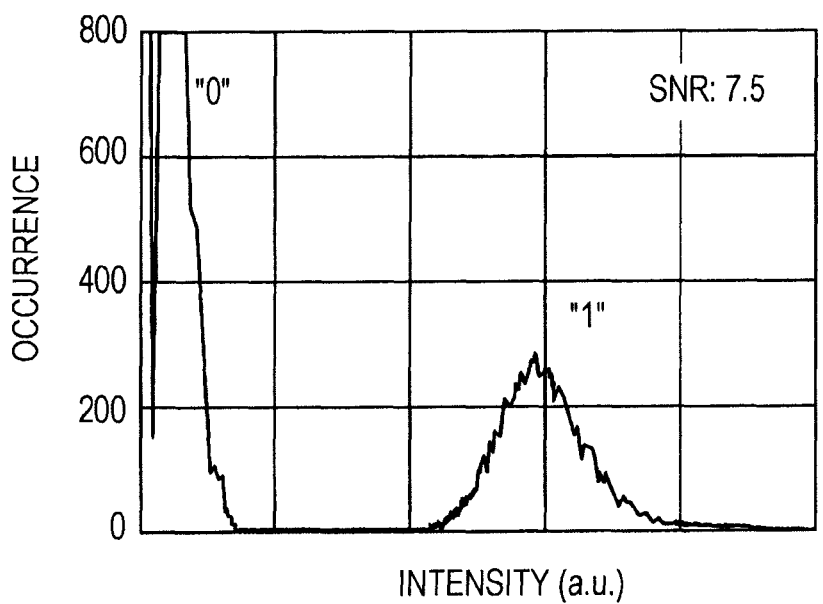

FIGS. 8A and 8B show, in histograms, the number of occurrences of data obtained from results of analysis on recording/playback. More specifically, FIG. 8A shows the case (which corresponds to FIGS. 5A and 5B) of the binary random pattern for each pixel unit and FIG. 8B shows the case of the binary random pattern for each random phase unit (N=M=2). The horizontal axis indicates a signal intensity and the vertical axis indicates the number of occurrences of data "0" and "1". Ideally, the data "0" should have a signal intensity of 0 and the data "1" should have a signal intensity represented by a certain absolute value that is greater than 0.

With this arrangement, with respect to distribution areas corresponding to signal intensities for the data "0", the distribution area shown in FIG. 8B has a favorable distribution (histogram shape) that has a small amount of disturbance and that is closer to a normal distribution, compared to that distribution area shown in FIG. 8A. In distribution areas for signal intensities for the data "1", the distribution area shown in FIG. 8B also has a more favorable histogram shape.

In the distribution areas for the signal intensities for the data "1", the distribution in FIG. 8B has shifted to higher intensity values, compared to the distribution area shown in FIG. 8A. Conversion of this result into an SNR (signal to noise ratio) showed that the SNR improves to 7.5 in the case of FIG. 8B while the SNR is 4.7 in the case of FIG. 8A.

Thus, the phase modulation using a binary random pattern for each random phase unit can provide an improved recording and playback characteristic over the phase modulation using a binary random pattern for each pixel unit.

The structure of the phase mask 13 for realizing the phase modulation using the random phase units may take the above-described exemplary physical form of the phase mask 13.

That is, with respect to the optical material (e.g., glass) used for forming the phase mask 13, a physical thickness that can give a phase of 0 may be set for portions corresponding to pixels for which a phase of 0 is set and a physical thickness that can given a phase of $\pi$ may be set for portions corresponding to pixels for which a phase of $\pi$ is set.

As can be understood from the above description of the setting of the number N of horizontal pixels and the number M of vertical pixels, the pixel array pattern for the random phase unit may have a pattern other than the 2×2 pixel array pattern (N=M=2) illustrated in FIG. 6.

For example, the pixel array pattern other than the 2×2 pixel array pattern may be a pixel array pattern in which N and M are equal to each other and are greater than 2.

Also, the pixel array pattern may be a pixel array pattern in which the number of all pixels that constitute the random phase unit is set to 2 or more and N is not equal to M.

In practice, for example, the pixel array pattern can be set, for example, by determining optimum values for the number N of horizontal pixels and the number M of vertical pixels on the basis of a result obtained from actual measurement or analysis or any other conceivable conditions. In general, however, it is desired to use the pixel array pattern for N=M since it can easily provide homogeneous, equivalent characteristics in both the horizontal and vertical directions.

The number x of pixels with a phase of 0 and the number y of pixels with a phase of $\pi$ for the random phase unit do not necessarily have to be the same. However, making x and y have the same value reduces limitations on combinations of the individual phase patterns of the random phase units and thus facilitates setting of the phase pattern.

The example shown in FIGS. 6A and 6B represents a case in which phase modulation is performed using a binary value. That is, phase modulation is performed using the phase "0" as a first modulation level and using the phase "$\pi$" as a second phase modulation level. The phase modulation in the present embodiment, however, is also applicable to a case in which the modulation is performed using multi values such as three values or four values, that is, a case in which the first to nth phase modulation levels satisfy n≧3. The phase modulation using three or more multi values can also be achieved by either of the phase mask and the phase modulator.

As described above, as the spatial light modulation, not only the phase modulation but also the light-intensity modulation can be performed on the reference light. Hence, the light-intensity modulation pattern to be applied to the reference light in the present embodiment will now be discussed.

When the random modulation units are used to apply the phase pattern to the reference light, it is preferable that the randomness of the phases of the random phase units set for the phase mask 13 be maintained as much as possible and the randomness be also given to the amplitudes on the light wave surface, in order to efficiently gain the above-described advantages. Accordingly, the use of a light-intensity modulation pattern that causes all pixels corresponding to the reference light to have a light intensity of 1 is optimum for the light intensity modulation using a light-intensity modulation element. The reason is that, in this case, the phase "0" and the phase "$\pi$" set for the phase mask 13 are directly reflected as the amplitude "+1" or the amplitude "−1", respectively.

The light-intensity modulation pattern described above is also referred to as a "solid pattern". This pattern can also be regarded as a light-intensity modulation pattern having a white rate of 1 (100%). The white rate in this case refers to the distribution ratio of pixels with a light intensity of 1 to pixels with a light intensity of 0 with respect to the reference light.

It is now assumed that a light-intensity modulation pattern having a white rate that is smaller than 1 is applied to the reference light, by way of example. The reference light in this case has a light-intensity modulation pattern in which pixels with a light intensity of 1 and pixels with a light intensity of 0 are mixed according to certain regularity. Consequently, pixels with an amplitude of 0 are produced, and correspondingly, the randomness of the phases of the random phase units is not maintained. This tendency is more prominent as the white rate decreases.

However, the use of the solid pattern may be inappropriate depending on characteristics of the hologram recording medium or characteristics of the system, and in some cases, it is preferable to use a light-intensity modulation pattern having a white rate that is smaller than 1 through appropriate mixture of the pixels with the light intensity "1" and the pixels with the light intensity "0". Examples of such a light-intensity modulation pattern having a white rate that is smaller than 1 include a radial pattern (which may be called a "spoke pattern" or the like) and a concentric pattern, as well as a random pattern.

A recording/playback apparatus according to a modification of the embodiment will be described below.

In the above embodiment, the phase modulation element is implemented by the phase mask 13.

As described above, the phase mask 13 has a pattern having different thicknesses of the optical material, such as glass, so as to correspond to the preset phase pattern. Thus, the phase pattern applied to the reference light is fixed according to the pattern having the thickness formed for the phase mask 13.

As opposed to the configuration, a phase element that is configured to allow a phase for each pixel to be variably given to the passing light is also available. Such a phase element makes it possible to form an arbitrary different phase pattern.

In the present embodiment, such a phase element is referred to as a "phase modulator" so that it is differentiated from a phase mask having a fixed phase pattern.

Although different parameters (a phase and an intensity) are modulated in the phase modulation and the light intensity modulation, what is modulated is spatial light. Thus, the phase modulation and the light intensity modulation are both referred to as "spatial light modulation".

The phase modulator described above can be configured using a transmissive liquid crystal panel.

For example, when a binary drive voltage representing ON/OFF is applied to the liquid crystal panel, the orientation of liquid crystal changes according to the ON/OFF of the drive voltage. For example, combination of a refractive index of the liquid crystal molecules and a change in the orientation allows two different phases to be given to the passing light.

An optical system having the above-described phase modulator can also be configured based on, for example, FIG. 1.

That is, the phase modulator may be disposed in place of the phase mask 13 shown in FIG. 1. In the case of a configuration including the phase modulator, the phase modulator and the light intensity modulator 3 can also be integrated into a single component to serve as an SLM, as in FIG. 4.

Figure 9:
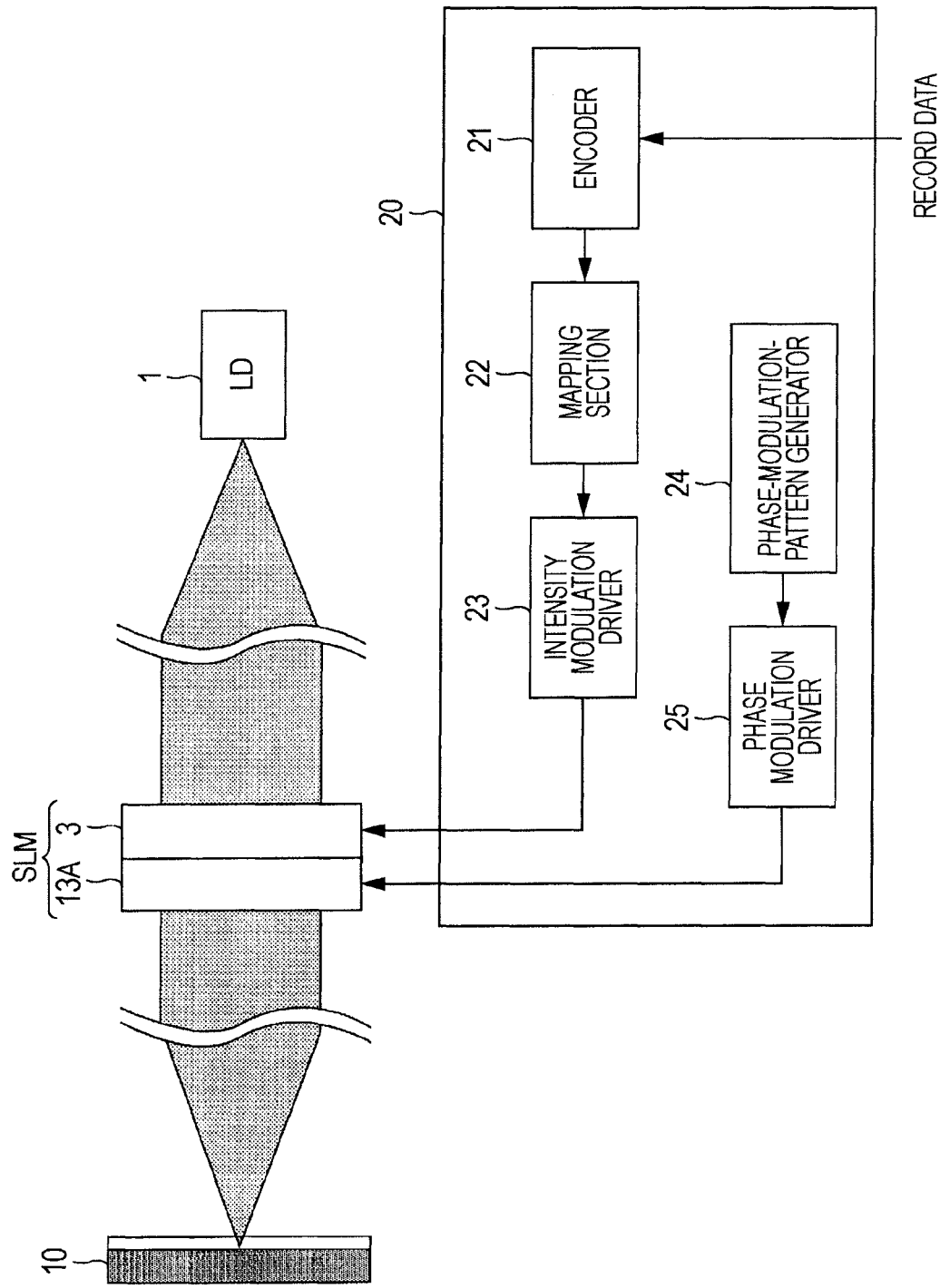
FIG. 9 is a diagram showing an example of the configuration of a record-signal processor for a case in which a phase modulator and a light intensity modulator are provided.
Figure 12A:
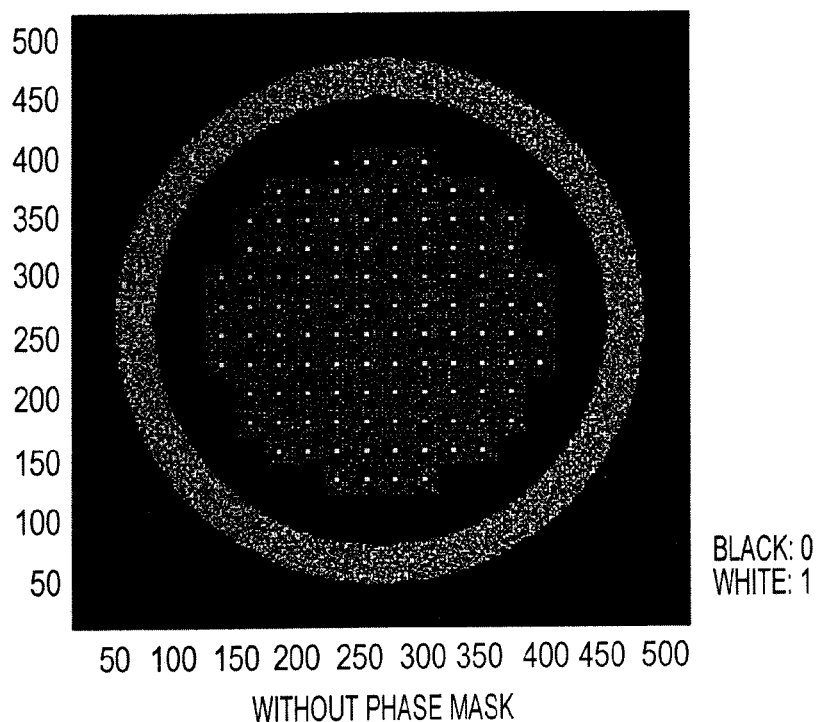
FIGS. 12A and 12B show the amplitudes of signal light and reference light, for comparison between the absence and the presence of a phase mask, respectively.
Figure 12B:
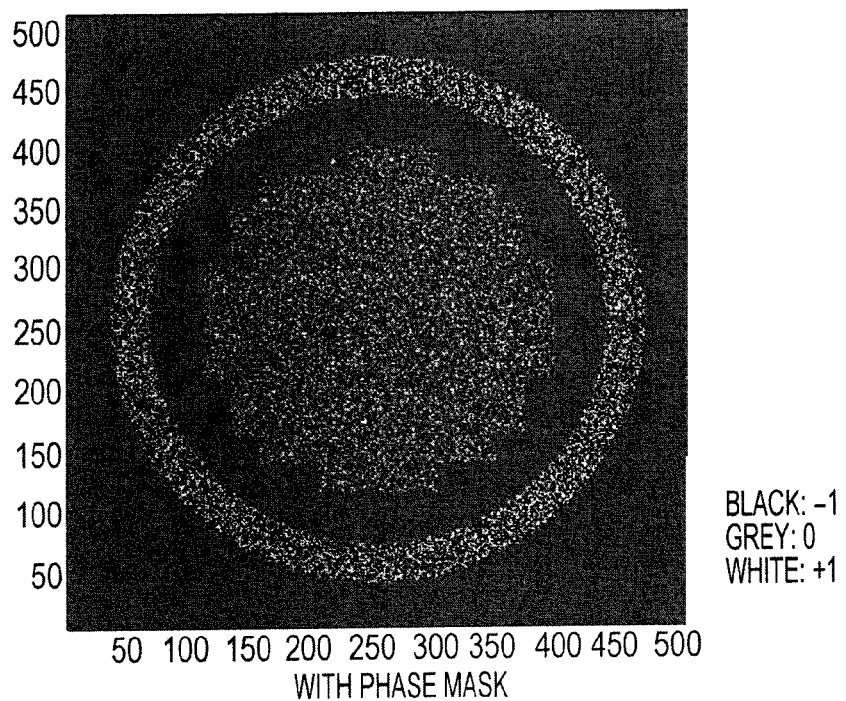

FIG. 9 shows an example of the configuration of the record-signal processor 20 for a case in which a phase modulator 13A and the light intensity modulator 3 are provided according to the modification. In the configuration shown in FIG. 9, the phase modulator 13A and the light intensity modulator 3 are integrated into a single component to serve an SLM, as in FIG. 4.

In FIG. 9, the SLM is shown in conjunction with the laser diode 1 and the hologram recording medium 10 to illustrate that the SLM is disposed on the optical path between the laser diode 1 and the hologram recording medium 10.

The record-signal processor 20 shown in FIG. 9 includes an encoder 21, a mapping section 22, an intensity modulation driver 23, a phase-modulation-pattern generator 24, and a phase modulation driver 25.

During recording, record data is input to the encoder 21. With respect to the input record data, the encoder 21 performs predetermined recording modulation and encoding processing according to a recording format. For example, sparse coding, which is typically used in a hologram recording/playback system, is performed to convert record data of 1 byte (=8 bits) into a rectangular-block-shaped data array having 16 bits (4×4 bits). The 16-bit (4×4 bit) data array is referred to as a "symbol" and is used as a minimum unit for encoding for recording.

During recording, in accordance with the recording format, the mapping section 22 arranges, in one hologram page, the data encoded by the encoder 21. The term "hologram page" refers to an entirety of data arrays that are laid down in the signal-light area A2. That is, the term "hologram page" as used herein refers to a data unit that can be recorded at once by interference between the signal light and the reference light.

In conjunction with the data mapping into the signal-light area A2, the mapping section 22 generates a data pattern in which predetermined pixels in the reference-light area A1 have a light intensity of 1, other pixels in the reference-light area A1 have a light intensity of 0, and all pixels in the gap area A3 and in the area outside the outer circumference of the reference-light area A1 have a light intensity of 0. The mapping section 22 then combines the thus-generated data pattern with the data pattern in the signal-light area A2 to generate a data pattern for all effective pixels of the light intensity modulator 3.

The thus-generated data pattern for all effective pixels of the light intensity modulator 3 is supplied to the intensity modulation driver 23. On the basis of the data pattern, the intensity modulation driver 23 drives and controls the individual pixels of the light intensity modulator 3.

Consequently, light that serves as source light for the signal light and that was subjected to the light intensity modulation using a pattern corresponding to the record data and light that serves as a source light for the reference light and that was subjected to light intensity modulation using a predetermined pattern are generated.

During recording, the mapping section 22 sequentially performs mapping for each hologram page with respect to the data encoded by the encoder 21, so that a data pattern in which only the data pattern in the signal-light area A2 changes sequentially in accordance with the contents of the record data is supplied to the intensity modulation driver 23. Thus, the intensity modulation driver 23 is adapted to sequentially drive and control the individual pixels of the light intensity modulator 3 on the basis of such data pattern for each hologram page.

This arrangement allows data to be recorded to the hologram recording medium 10 for each hologram page.

During recording, in conjunction with the above-described operation for driving and controlling the light intensity modulator 3, the record-signal processor 20 also performs operation for driving and controlling the phase modulator 13A.

Thus, in order to perform phase modulation for the phase mask, the phase-modulation-pattern generator 24 generates a phase modulation pattern to be set for the signal-light area A2 by the phase modulator 13A, on the basis of a predetermined data pattern.

As the phase modulation pattern for the phase mask, a binary random pattern is set.

In addition, the phase-modulation-pattern generator 24 generates a predetermined phase modulation pattern (which refers to a state of distribution of phases to be given to individual pixels in accordance with a phase pattern) to be set for the reference-light area A1 of the phase modulator 13A. As described in the above embodiment, a phase modulation pattern corresponding to the number of pixels according to the preset minimum modulation unit is generated (the number of pixels is a natural number of 2 or greater).

The phase-modulation-pattern generator 24 combines the thus-generated phase modulation patterns (i.e., control patterns for the corresponding pixels) for the signal-light area A2 and the reference-light area A1 to generate a phase modulation pattern for all effective pixels of the phase modulator 13A. Pixels other than those in the signal-light area A2 and the reference-light area A1 may be set to have values corresponding to, for example, a phase of 0.

The phase modulation pattern generated in such a manner is supplied to the phase modulation driver 25.

The phase modulation driver 25 drives and controls the individual pixels of the phase modulator 13A on the basis of the phase modulation pattern supplied from the phase-modulation-pattern generator 24. This arrangement can apply a predetermined phase pattern to the signal light and the reference light that have passed through the SLM.

During playback, the phase-modulation-pattern generator 24 and the phase modulation driver 25 perform operation to drive the phase modulator 13A so that reference light having the same phase pattern as that applied during recording is generated for each hologram page to be played back.

Thus, the configuration including the phase modulator 13A makes it possible to perform data (hologram page) multiplexed recording on the hologram recording medium.

That is, this arrangement provides the selectivity of allowing signal light (data and hologram pages) recorded using reference light having a certain phase structure to be read during playback by shinning only reference light having the same phase structure (phase pattern). This is applied to the configuration of the embodiment, and during recording, multiple hologram pages are recorded using reference light having different phase patterns and thus, during playback, reference light having the same phase pattern as that applied during the recording is shined to each hologram page. This arrangement makes it possible to selectively read data recorded on each hologram page.

That is, during recording and during playback, the phase modulator 13A may be driven so that different phase patterns are formed so as to correspond to the respective hologram pages, as described above. With this arrangement, even for the data recorded on multiple hologram pages, a specific one of the hologram pages can be correctly selected and read. That is, hologram-page multiplexed recording can be performed.

For example, when the phase mask 13, not the phase modulator 13A, is disposed as the phase modulation element, as shown in FIG. 1, the record-signal processor 20 may have a configuration in which the phase-modulation-pattern generator 24 and the phase modulation driver 25, which are associated with driving of the phase modulator 13A, are eliminated.

As can be understood from the above description, the present embodiment features the configuration for the spatial light modulation (phase modulation) for the reference light. During recording, the signal light is given a light-intensity modulation pattern having 1 and 0 in accordance with data. Thus, typically, it is not necessary to apply the phase modulation using the random phase units to the phase modulation of the signal light. In the present embodiment, therefore, the phase modulation of the signal light may be any phase modulation. In practice, in terms of suppressing the peak of DC components, the phase modulation using a binary random pattern for each pixel unit is optimum.

Although an example of the recording/playback apparatus that is capable of performing recording and playback on a hologram recording medium has been described in the above embodiment, the configuration in the embodiment is also advantageously applicable to a playback apparatus that is capable of performing only playback on a hologram recording medium and a recording apparatus that is capable of performing only recording.

Although a case in which the ring-shaped reference-light area is provided outside the circular signal-light area has been described above by way of example, the shapes of the reference-light area and the signal-light area are not limited to the ring shape and the circular shape. The reference-light area may also be provided inside the signal-light area.

Although a case in which the light intensity modulator is implemented by a liquid crystal panel that allows light intensity modulation to be variably performed in accordance with the drive voltage level has been described above, the light intensity modulator may be realized by other type of liquid crystal panel than the transmissive liquid crystal panel illustrated in the embodiment. For example, the light intensity modulator may be realized by a reflective liquid crystal panel, depending upon the structure of an optical system.

Although a case in which the phase modulator is implemented by a transmissive liquid crystal panel has been described above by way of example, for example, the phase modulator may also be implemented by any other element that allows the phase pattern to be changed in accordance with the drive voltage level for each pixel.

While a reflective hologram recording medium, as well as a transmissive hologram recording medium, is also available as the hologram recording medium for recording/playback, either type of the hologram recording medium can be used in the present embodiment.

The present application contains subject matter related to that disclosed in Japanese Priority Patent Application JP 2008-229639 filed in the Japan Patent Office on Sep. 8, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A recording/playback apparatus comprising:

light-generating and intensity-modulating means for generating, in response to incident light from a light source, signal light and reference light to be shined on a hologram recording medium, wherein during recording, the light-generating and intensity-modulating means generates the signal light by performing light intensity modulation for each pixel unit in accordance with record data and generates the reference light by performing light intensity modulation for each pixel unit so that the reference light has a predetermined light-intensity modulation pattern, the reference light being used for recording data to the hologram recording medium through interference fringes formed together with the signal light, and during playback, the light-generating and intensity-modulating means generates the reference light having the predetermined light-intensity modulation pattern, the reference light being used for obtaining playback light from the hologram recording medium; and phase modulating means for performing phase modulation on the signal light and the reference light on a basis of the pixel unit by using first to nth phase modulation levels, where n is a natural number of 2 or greater, wherein the phase modulating means performs the phase modulation on the reference light, with all pixels corresponding to the reference light being divided and set using random phase units, each having a specific pixel array pattern having at least two pixels represented by N horizontal pixels by M vertical pixels, where N and M are natural numbers of 1 or greater, with the number of pixels corresponding to each of the first to nth phase modulation levels in each random phase unit being set to be common to the random phase units, and with the array pattern of the pixels corresponding to the first to nth phase modulation levels being set to be random for each random phase unit.

2. The recording/playback apparatus according to claim 1, wherein the light-generating and intensity-modulating means performs the light intensity modulation to give a light intensity represented by 1 or 0 for each pixel and performs the light intensity modulation on the reference light so that all pixels corresponding to the reference light have a light intensity of 1 with respect to the predetermined light-intensity modulation pattern.

3. A recording apparatus comprising:
light-generating and intensity-modulating means for generating, in response to incident light from a light source, signal light and reference light to be shined on a hologram recording medium, wherein the light-generating and intensity-modulating means generates the signal light by performing light intensity modulation for each pixel unit in accordance with record data and generates the reference light by performing light intensity modulation for each pixel unit so that the reference light has a predetermined light-intensity modulation pattern, the reference light being used for recording data to the hologram recording medium through interference fringes formed together with the signal light; and
phase modulating means for performing phase modulation on the reference light, with all pixels corresponding to the reference light being divided and set using random phase units, each having a specific pixel array pattern having at least two pixels represented by N horizontal pixels by M vertical pixels, where N and M are natural numbers of 1 or greater, with the number of pixels corresponding to each of first to nth phase modulation levels in each random phase unit being set to be common to the random phase units, where n is a natural number of 2 or greater, and with the array pattern of the pixels corresponding to the first to nth phase modulation levels being set to be random for each random phase unit.

4. A playback apparatus comprising:
light-generating and intensity-modulating means for generating, in response to incident light from a light source, reference light to be shined on a hologram recording medium in order to obtain playback light from the hologram recording medium, wherein the light-generating and intensity-modulating means generates the reference light by performing light intensity modulation for each pixel unit so that the reference light has a predetermined light-intensity modulation pattern; and
phase modulating means for performing phase modulation on the reference light, with all pixels corresponding to the reference light being divided and set using random phase units, each having a specific pixel array pattern having at least two pixels represented by N horizontal pixels by M vertical pixels, where N and M are natural numbers of 1 or greater, with the number of pixels corresponding to each of first to nth phase modulation levels in each random phase unit being set to be common to the random phase units, where n is a natural number of 2 or greater, and with the array pattern of the pixels corresponding to the first to nth phase modulation levels being set to be random for each random phase unit.

5. A recording/playback method comprising:
generating, in response to incident light from a light source, signal light and reference light to be shined on a hologram recording medium, wherein during recording, the signal light is generated by performing light intensity modulation for each pixel unit in accordance with record data and the reference light is generated by performing light intensity modulation for each pixel unit so that the reference light has a predetermined light-intensity modulation pattern, the reference light being used for recording data to the hologram recording medium through interference fringes formed together with the signal light, and during playback, the reference light having the predetermined light-intensity modulation pattern is generated, the reference light being used for obtaining playback light from the hologram recording medium; and
performing phase modulation on the signal light and the reference light on a basis of the pixel unit by using first to nth phase modulation levels, where n is a natural number of 2 or greater, wherein the phase modulation is performed on the reference light, with all pixels corresponding to the reference light being divided and set using random phase units, each having a specific pixel array pattern having at least two pixels represented by N horizontal pixels by M vertical pixels, where N and M are natural numbers of 1 or greater, with the number of pixels corresponding to each of the first to nth phase modulation levels in each random phase unit being set to be common to the random phase units, and with the array pattern of the pixels corresponding to the first to nth phase modulation levels being set to be random for each random phase unit.

6. A recording method comprising the steps of:
generating, in response to incident light from a light source, signal light and reference light to be shined on a hologram recording medium, wherein the signal light is generated by performing light intensity modulation for each pixel unit in accordance with record data and generates the reference light by performing light intensity modulation for each pixel unit so that the reference light has a predetermined light-intensity modulation pattern, the reference light being used for recording data to the hologram recording medium through interference fringes formed together with the signal light; and
performing phase modulation on the reference light, with all pixels corresponding to the reference light being divided and set using random phase units, each having a specific pixel array pattern having at least two pixels represented by N horizontal pixels by M vertical pixels, where N and M are natural numbers of 1 or greater, with the number of pixels corresponding to each of first to nth phase modulation levels in each random phase unit being set to be common to the random phase units, where n is a natural number of 2 or greater, and with the array pattern of the pixels corresponding to the first to nth phase modulation levels being set to be random for each random phase unit.

7. A playback method comprising the steps of:
generating, in response to incident light from a light source, reference light to be shined on a hologram recording medium in order to obtain playback light from the hologram recording medium, wherein the reference light is generated by performing light intensity modulation for each pixel unit so that the reference light has a predetermined light-intensity modulation pattern; and
performing phase modulation on the reference light, with all pixels corresponding to the reference light being divided and set using random phase units, each having a specific pixel array pattern having at least two pixels represented by N horizontal pixels by M vertical pixels, where N and M are natural numbers of 1 or greater, with the number of pixels corresponding to each of first to nth phase modulation levels in each random phase unit being set to be common to the random phase units, where n is a natural number of 2 or greater, and with the array pattern of the pixels corresponding to the first to nth phase modulation levels being set to be random for each random phase unit.

8. A recording/playback apparatus comprising:

a light-generating and intensity-modulating section configured to generate, in response to incident light from a light source, signal light and reference light to be shined on a hologram recording medium, wherein during recording, the light-generating and intensity-modulating section generates the signal light by performing light intensity modulation for each pixel unit in accordance with record data and generates the reference light by performing light intensity modulation for each pixel unit so that the reference light has a predetermined light-intensity modulation pattern, the reference light being used for recording data to the hologram recording medium through interference fringes formed together with the signal light, and during playback, the light-generating and intensity-modulating section generates the reference light having the predetermined light-intensity modulation pattern, the reference light being used for obtaining playback light from the hologram recording medium; and a phase modulating section configured to perform phase modulation on the signal light and the reference light on a basis of the pixel unit by using first to nth phase modulation levels, where n is a natural number of 2 or greater, wherein the phase modulating section performs the phase modulation on the reference light, with all pixels corresponding to the reference light being divided and set using random phase units, each having a specific pixel array pattern having at least two pixels represented by N horizontal pixels by M vertical pixels, where N and M are natural numbers of 1 or greater, with the number of pixels corresponding to each of the first to nth phase modulation levels in each random phase unit being set to be common to the random phase units, and with the array pattern of the pixels corresponding to the first to nth phase modulation levels being set to be random for each random phase unit.

9. The recording/playback apparatus according to claim 8, wherein the light-generating and intensity-modulating section performs the light intensity modulation to give a light intensity represented by 1 or 0 for each pixel and performs the light intensity modulation on the reference light so that all pixels corresponding to the reference light have a light intensity of 1 with respect to the predetermined light-intensity modulation pattern.

10. A recording apparatus comprising:

a light-generating and intensity-modulating section configured to generate, in response to incident light from a light source, signal light and reference light to be shined on a hologram recording medium, wherein the light-generating and intensity-modulating section generates the signal light by performing light intensity modulation for each pixel unit in accordance with record data and generates the reference light by performing light intensity modulation for each pixel unit so that the reference light has a predetermined light-intensity modulation pattern, the reference light being used for recording data to the hologram recording medium through interference fringes formed together with the signal light; and a phase modulating section configured to perform phase modulation on the reference light, with all pixels corresponding to the reference light being divided and set using random phase units, each having a specific pixel array pattern having at least two pixels represented by N horizontal pixels by M vertical pixels, where N and M are natural numbers of 1 or greater, with the number of pixels corresponding to each of first to nth phase modulation levels in each random phase unit being set to be common to the random phase units, where n is a natural number of 2 or greater, and with the array pattern of the pixels corresponding to the first to nth phase modulation levels being set to be random for each random phase unit.

11. A playback apparatus comprising:

a light-generating and intensity-modulating section configured to generate, in response to incident light from a light source, reference light to be shined on a hologram recording medium in order to obtain playback light from the hologram recording medium, wherein the light-generating and intensity-modulating section generates the reference light by performing light intensity modulation for each pixel unit so that the reference light has a predetermined light-intensity modulation pattern; and a phase modulating section configured to perform phase modulation on the reference light, with all pixels corresponding to the reference light being divided and set using random phase units, each having a specific pixel array pattern having at least two pixels represented by N horizontal pixels by M vertical pixels, where N and M are natural numbers of 1 or greater, with the number of pixels corresponding to each of first to nth phase modulation levels in each random phase unit being set to be common to the random phase units, where n is a natural number of 2 or greater, and with the array pattern of the pixels corresponding to the first to nth phase modulation levels being set to be random for each random phase unit.

* * * * *